(12) United States Patent
Carpinelli et al.

(10) Patent No.: US 7,324,071 B2
(45) Date of Patent: Jan. 29, 2008

(54) SEGMENTED CHARACTER DISPLAY

(75) Inventors: Joseph M Carpinelli, Lawrenceville, NJ (US); George Herbert Needham Riddle, Princeton, NJ (US); Ian Gregory Hill, Halifax (CA)

(73) Assignee: Sarnoff Corporation, Princeton, NJ (US)

( * ) Notice: Subject to any disclaimer, the term of this patent is extended or adjusted under 35 U.S.C. 154(b) by 690 days.

(21) Appl. No.: 10/939,651

(22) Filed: Sep. 13, 2004

(65) Prior Publication Data

US 2005/0073473 A1    Apr. 7, 2005

Related U.S. Application Data

(60) Provisional application No. 60/503,331, filed on Sep. 16, 2003.

(51) Int. Cl.
     *G06F 17/60*      (2006.01)
(52) U.S. Cl. .................. 345/33; 345/1.1; 345/30; 345/34; 349/56; 705/20; 705/27; 705/411
(58) Field of Classification Search ............... 345/1.1, 345/30, 33, 34; 349/56; 705/20, 27, 411
See application file for complete search history.

(56) References Cited

U.S. PATENT DOCUMENTS

| | | | |
|---|---|---|---|
| 3,631,298 A | 12/1971 | Davis | |
| 3,787,834 A * | 1/1974 | Elliott | ......................... 345/103 |
| 4,102,122 A * | 7/1978 | Tanaka | ......................... 368/28 |
| 4,158,103 A | 6/1979 | Danilin et al. | |
| 4,184,319 A * | 1/1980 | Kumata | ......................... 368/83 |
| 4,639,545 A | 1/1987 | Pithouse et al. | |
| 4,654,748 A | 3/1987 | Rees | |
| 4,668,545 A | 5/1987 | Lowe | |
| 4,700,054 A | 10/1987 | Triplett et al. | |
| 5,045,706 A | 9/1991 | Tanaka et al. | |
| 5,102,727 A | 4/1992 | Pittman et al. | |
| 5,358,758 A | 10/1994 | Skelton et al. | |
| 5,422,462 A | 6/1995 | Kishimoto | |
| 5,501,133 A | 3/1996 | Brookstein et al. | |
| 5,586,237 A * | 12/1996 | Baecker et al. | ............. 345/670 |
| 5,697,969 A | 12/1997 | Schmitt et al. | |
| 5,767,824 A | 6/1998 | Jacobsen | |
| 5,797,132 A * | 8/1998 | Altwasser | .................... 705/16 |
| 5,802,607 A | 9/1998 | Triplette | |

(Continued)

FOREIGN PATENT DOCUMENTS

WO     WO 99/19858     4/1999

(Continued)

OTHER PUBLICATIONS

International Search Report, May 19, 2005, 2 Pages.

(Continued)

*Primary Examiner*—Richard Hjerpe
*Assistant Examiner*—Vincent E. Kovalick
(74) *Attorney, Agent, or Firm*—Lowenstein Sandler PC (57) ABSTRACT

A character display comprises fifty-nine segments arranged into rows and columns. Twenty eight of the fifty-nine segments define a periphery of the display, eleven additional segments define horizontal and vertical dividers that define four quadrants, and five additional segments are disposed in each of the four quadrants to define diagonals thereof.

21 Claims, 7 Drawing Sheets

U.S. PATENT DOCUMENTS

| | | | |
|---|---|---|---|
| 5,927,060 | A | 7/1999 | Watson |
| 5,962,967 | A | 10/1999 | Kiryuschev et al. |
| 6,032,450 | A | 3/2000 | Blum |
| 6,045,575 | A | 4/2000 | Rosen et al. |
| 6,072,619 | A | 6/2000 | Kiryuschev et al. |
| 6,145,551 | A | 11/2000 | Jayaraman et al. |
| 6,153,124 | A | 11/2000 | Hung |
| 6,210,771 | B1 | 4/2001 | Post et al. |
| 6,315,009 | B1 | 11/2001 | Jayaraman et al. |
| 6,326,947 | B1 | 12/2001 | Capps |
| 6,370,019 | B1 | 4/2002 | Matthies et al. |
| 6,381,482 | B1 | 4/2002 | Jayaraman et al. |
| 2001/0036785 | A1 | 11/2001 | Takagi et al. |
| 2002/0074937 | A1 | 6/2002 | Guberman et al. |
| 2002/0076948 | A1 | 6/2002 | Farrell et al. |
| 2002/0167483 | A1 | 11/2002 | Metcalf |

FOREIGN PATENT DOCUMENTS

| | | |
|---|---|---|
| WO | WO 99/41732 | 8/1999 |
| WO | WO 02/40091 | 5/2002 |

OTHER PUBLICATIONS

Written Opinion of the International Searching Authority, May 19, 2005, 3 Pages.

Maxim Integrated Products, "DS18B20X Flipchip 1-Wire Digital Thermometer," http://www.maxim-ic.com/quick_view2.cfm?qv_pk=2814, Printed Sep. 9, 2002, 2 pages.

Sarnoff Corporation, "Large-Area Ultra-Flexible e-Textile Array Circuits Demonstrated with Color and IR Yarn," Proposal Abstract, Princeton, NJ, Sep. 27, 2001, 10 Pages.

Sarnoff Corporation, "e-Textile Interconnect and Component Attach Technology," vol. 1, Technical/Management Proposal, #2002314, Princeton, NJ, Dec. 4, 2001, 36 Pages.

Sarnoff Corporation, Textile-based IR and Visible Active Camouflage, Concept Paper, Princeton, NJ, Feb. 7, 2002, 6 Pages.

Airforce Research Laboratory, "Programmable Infrared Marker," Fact Sheet, Kirkland AFB NM, http://de.afri.af.mil./Factsheets/prim1.html, Printed May 28, 2002, 1 Page.

Post et al, "E-broidery: Design and fabrication of textile-based computing," IBM Systems Journal, vol. 39, Nos. 3 & 4, 2000, pp. 840-860.

Maxim Integrated Products, "World's First 4-Digit 5×7 Led Driver In A Single Chip!," Sunnyvale, CA, 2002, 1 Page.

Linx Technologies, "LC Series Transmitter Module Data Guide," Revised Dec. 21, 2001, 3 Pages.

Circuit Cellar, http://www.circuitcellar.com/pastissues/articles/jeff-105/text.html, Printed Jul. 16, 2002, 4 Pages.

Dallas Semiconductor Maxim, "1-Wire Products, Mixed-Signal Design Guide," 2001, 7 Pages.

Dallas Semiconductor, "DS2406 At-A-Glance," Dual Addressable Switch Plus 1kb Memory, http://www.maxim-ic.com/at-a-glance.cfm?qv_pk=2907, May 13, 2004, 1 Page.

Dallas Semiconductor, "DS2406 Dual addressable Switch Plus 1kbit Memory," www.maxim-ic.com, No date listed, 31 Pages.

Dallas Semiconductor, "Overview of 1-Wire Technology and Its Use," http://www.maxim-ic.com/appnotes.cfm/appnote_number/1796, May 13, 2004, 7 Pages.

Glenn Zorpette, "Let There Be Light," IEEE Spectrum, Sep. 2002, pp. 70-74.

Infineon Technologies AG, "News—Infineon presents concept for "smart" industrial textiles—far reaching fields of application for electronic integrated into textiles," http://www.infineon.com/cgi/ecrm.dll/jsp/showfronted.do?lang-EN&news_nav_oid=997 . . . , May 5, 2003, 7 Pages.

Infineon Technologies AG, "News—Infineon develops chip network for textiles—Intelligence by the meter," May 5, 2003, 11 Pages.

Darpa, BAA01-41, "Electronic Textiles," (2 Pages), plus Section I (11 Pages) and Section II (4 Pages), 2001.

Thad Starner, "The Challenges Of Wearable Computing: Part 1," IEEE Micro, Georgia Institute Of Technology, pp. 44-52, Jul.-Aug. 2001.

Thad Starner, "The Challentes Of Wearable Computing: Part 2," IEEE Micro, Georgia Institute Of Technology, pp. 54-67, Jul.-Aug. 2001.

Listening Large: E-Textiles for Battlefield Sound Detection Begin Field Tests This Year, Information Sciences Institute, www.usc.edu/isinews/print/p57.html, Printed Jun. 22, 2004, 3 Pages.

Lightscience.com, Engineering researchers are designing the ultimate fabrics, for casual or military wear, www.light-science.com/vtfashion.html, Printed Jun. 22, 2004, 3 Pages.

Engineering Researchers are Designing the Ultimate Fabrics, for Casual or Military Wear, http://www.eurekalert.org/pub_releases/2002-11/vt-era 110702.php, Printed Jun. 22, 2004, 2 Pages.

Smart Sensor Textiles Under Development, Future pundit, http://www.futurepundit/com/archives/000595.html, Printed Jun. 22, 2004, 6 Pages.

Engineering Researchers are Designing the Ultimate Fabrics, Virgina Tech, (Virginia Polytechnic Institute and State University), http://newswise.com/p/articles/view/32667/,Printed Jun. 22, 2004, 2 Pages.

http://www.research_vt.edu/resmag/photo/STRETCH/jpg, Printed Jun. 22, 2004, 1 Page.

\* cited by examiner

SEGMENTED CHARACTER DISPLAY

This Application claims the benefit of U.S. Provisional Application No. 60/503,331 filed Sep. 16, 2003, which is hereby incorporated herein by reference.

The present invention relates to a display and, in particular, to a character display.

In many fields of endeavor, from military to sport to apparel, a desire exists for electronic circuits to be incorporated into fabric and into articles that may be made of fabric. In some instances, such as electric blankets and electrically conductive fabric, electrically resistive and/or electrically conductive wires are been woven into fabric with insulating yarn to provide the desired resistance heating and/or conductivity characteristics. In these relatively simple arrangements, the characteristics of the resistive heating yarn determines the heating characteristics of the woven electric blanket and the conductivity of the electrically conductive yarn substantially determines the conductivity characteristic of the fabric. In other words, the number and size of electrically conductive yarn determine the conductivity of the fabric.

Apart from the aforementioned relatively simple arrangements, where electrical functionality of greater complexity has been desired, electrical circuits have been added to fabric after the fabric is woven. Among the approaches are the lamination of electrical circuit substrates to a fabric, e.g., as described in U.S. Patent Publication No. US 2002/0076948 of B. Farrell et al entitled "Method of Manufacturing a Fabric Article to Include Electronic Circuitry and an Electrically Active Textile Article," and the embroidering and/or applique of electrical conductors and circuits onto a fabric, e.g., as described in U.S. Pat. No. 6,210,771 to E. R. Post et al entitled "Electrically Active Textiles and Articles Made Therefrom" and in an article by E. R. Post et al entitled "E-Broidery: Design and Fabrication of Textile-Based Computing" published in the IBM Systems Journal, Volume 39, Numbers 3 & 4, pages 840-860, 2000. In addition, an arrangement attaching electrical components to woven fabric including conductive yarn, such as by connecting the components to the conductive yarn by soldering and/or by electrically conductive adhesive, is described in U.S. Pat. No. 6,381,482 to Jayaraman et al entitled "Fabric or Garment With Integrated Flexible Information Infrastructure."

In the aforementioned arrangements, the electrical or electronic function is added after the fabric has been woven, e.g., by embroidery or by applique or by mechanical attachment, thereby adding additional steps and additional complexity to the manufacturing process. In addition, the particular arrangement thereof appears to be suited to one specific application or usage with corresponding specific manufacturing, and does not appear to lend itself to an efficient, relatively general manufacturing wherein the function and operation of the resulting fabric need not be specified or determined until after the fabric is woven, i.e. manufactured.

There remains a need for an electronic display that provides for a distinctive character display. In addition, it would be desirable that such character display would be suitable for being provided as a woven article or fabric. It would also be desirable if such character display is suitable for use in a flexible electronic display, e.g., as a sign or other message display.

To this end, a display may comprise fifty-nine segments arranged into rows and columns. Twenty eight of the fifty-nine segments define a periphery of the display, eleven additional segments define horizontal and vertical dividers that define four quadrants, and five additional segments are disposed in each of the four quadrants to define diagonals thereof.

BRIEF DESCRIPTION OF THE DRAWING

The detailed description of the preferred embodiment(s) will be more easily and better understood when read in conjunction with the FIGURES of the Drawing which include.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity.

DESCRIPTION OF THE PREFERRED EMBODIMENT(S)

Figure 1A:
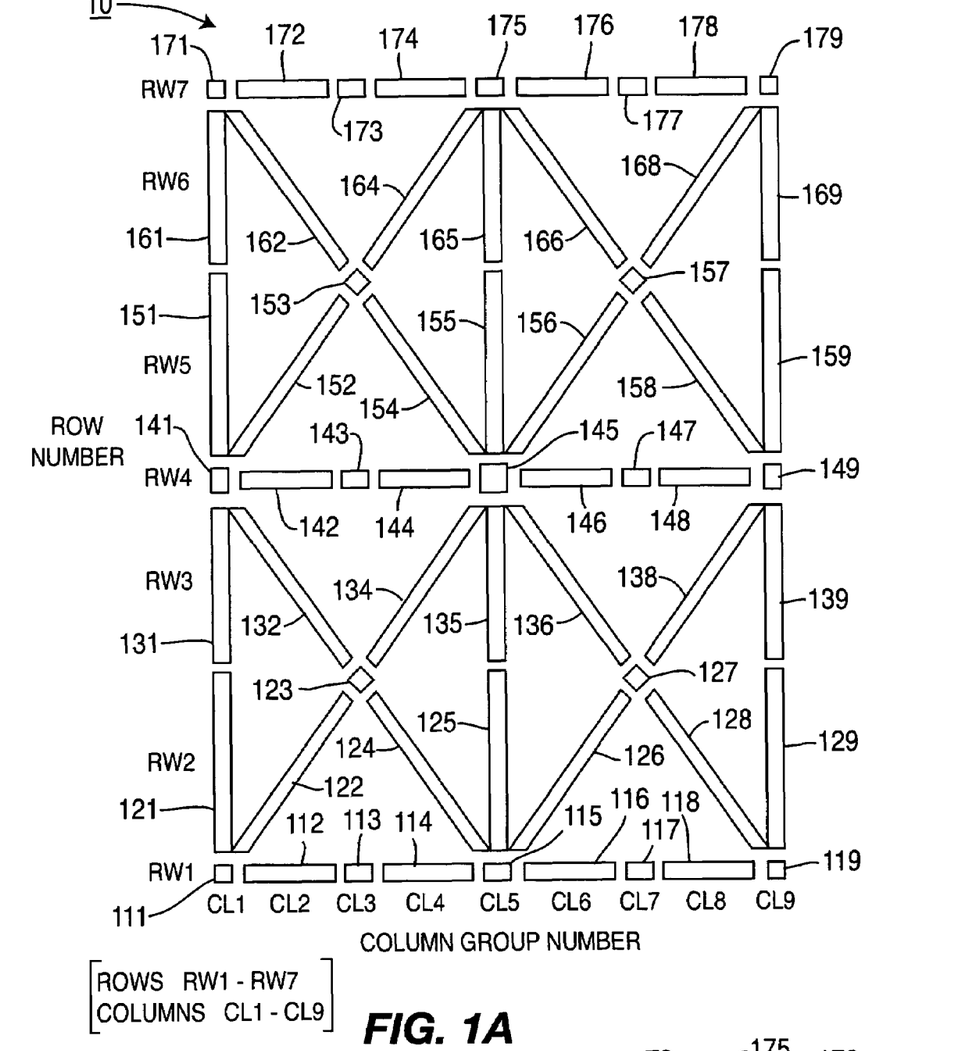
FIGS. 1A and 1B are schematic diagrams of an example arrangement for a 59-segment character display.
Figure 1B:
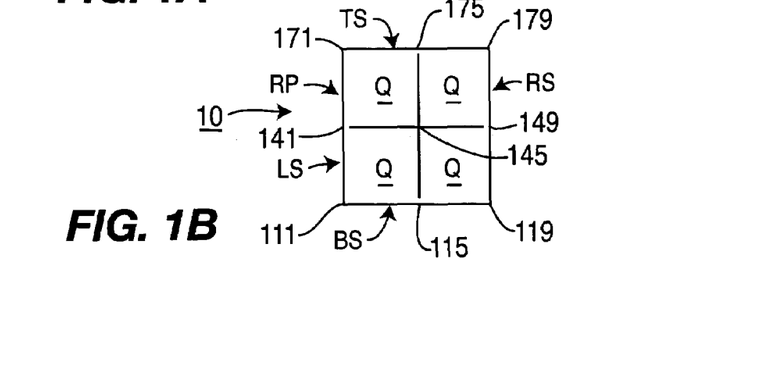

FIGS. 1A and 1B are schematic diagrams of an example arrangement for a 59-segment character display 10 wherein the 59 segments are numbered according to their position in a row and column arrangement.

The segmented character display 10 having fifty nine segments arranged in rows and columns comprises twenty eight segments defining a periphery RP of a generally rectangular character display 10, the twenty eight segments including one segment disposed at each corner 111, 171, 179, 119 of the generally rectangular periphery RP, and four groups of five or more additional segments each disposed to define a respective side TS, RS, BS, LS thereof.

Eleven additional segments are disposed to define intersecting dividers that divide the generally rectangular character display 10 to define four quadrants Q thereof, wherein one segment 145 of the eleven additional segments is disposed generally centrally within the generally rectangular character display 10 and the ten other segments of the eleven additional segments are arranged to extend from the one generally centrally disposed segment 145 of the eleven additional segments to the respective sides TS, RS, BS, LS of the generally rectangular character display 10.

Five segments are disposed within each of the four quadrants Q, each quadrant including a generally centrally located segment 123, 127, 153, 157 and four segments radiating diagonally from the central segment 123, 127, 153, 157 toward each of the four corners 111, 115, 119, 141, 145, 149, 171, 175, 179 of each quadrant Q.

More particularly, the segments of display 10 are arranged into seven rows designated RW1 through RW7 and nine columns designated CL1-CL9, with row RW1 and column CL1 intersecting at the lower left corner of display character 10. Each segment is identified by a numeric designator "1yx" wherein "y" is the row number and "x" is the column number corresponding to rows RW1 through RW7 and columns CL1 through CL9, respectively. Thus, a row of segments could be referred to by row number or be segment numbers, e.g., row 3 by RW3 or by segments 13x, and columns likewise, e.g., as column CL5 or as segments 1×5.

Twenty eight of the segments comprising rows RW1 and RW7 and columns CL1 and CL9 (segments 11x, 17x, 1y1, 1y9) define a rectangular periphery RP of character display 10. One relatively short segment 111, 171, 119, 179, is at each corner of the rectangle RP. Seven additional segments define the "top" horizontal side TS (i.e. segments 172, 173, 174, 175, 176, 177, 178) and the "bottom" horizontal side BS (i.e segments 112, 113, 114, 115, 116, 117, 118) of peripheral rectangle RP and five additional segments (i.e. segments 121, 131, 141, 151, 161 and segments 129, 139, 149, 159, 169, respectively) define each of the vertical sides LS, RS of rectangle RP. Each of the four sides BS, RS, LS, TS of rectangle RP has a relatively short segment 115, 141, 149, 175 in a central position, and each also has four relatively long segments (e.g., 121, 131, 151 and 161; 172, 174, 176 and 178; and so forth) with a pair of two long segments (e.g., 121 and 131, 116 and 118; and so forth) disposed on opposing sides of the short central segment 115, 141, 149, 175. Each of the top and bottom sides TS, RS also has a relatively short segment 113, 117, 173, 177 disposed between each pair of relatively long segments (e.g., 112 and 114, 116 and 118, and so forth).

Eleven additional segments 142, 143, 144, 145, 146, 147, 148, 125, 135, 155, 165 divide the peripheral rectangle into four quadrants Q. Specifically, seven segments 142, 143, 144, 145, 146, 147, 148, bisect peripheral rectangle RP in the horizontal direction between the relatively short central segment 141, 149 of each vertical side RS, LS and five segments 125, 135, 145, 155, 165 bisect rectangle RP in the vertical direction between the relatively short central segments 115, 175 of the top and bottom sides TS, BS. Segment 145 is located where the four quadrants Q meet and is relatively centrally located within peripheral rectangle RP.

Inside each quadrant Q is a centrally located relatively short segment 123, 153, 127, 157 and four relatively long segments (e.g., 122, 132, 124, 134; 152, 162, 154, 164; and so forth) radiating diagonally from the short central segment 123, 153, 127, 157 toward each of the corners of the quadrant Q, i.e. at a short segment at each corner of each quadrant. For example, in upper right quadrant Q, segments 156, 166, 158, 168 radiate diagonally from the short central segment 157 toward each of the corners 145, 175, 179 and 149.

It is noted that while center segments 123 and 127 are described as being in row RW2 and center segments 153 and 157 are described as being in row RW5, they could be designated in rows RW3 and RW6, respectively, as may be convenient or desired.

Each segment 111-179 includes one or more sources that produce light when electrically energized. By selectively energizing certain ones of the segments 111-179, light produced by the energized segments 111-179 define desired characters. This arrangement provides a unique display for each letter of the English-language alphabet, in both upper case and lower case letters, and the numerals zero through nine, as well as other symbols and characters, such as "?" or "$" or "%" or "+" or "−" or "×" or "÷" or "*" or "<" or ">" or "&" or "↑" or "↓" or "←" or "→" or "Δ" or "Σ" or "λ" and so forth. The display may be addressed as a 9×7 matrix where four of the segments are missing, leaving 59 segments that may be selectively energized.

For example, the capital letter "O" may be displayed by energizing the 28 segments around the peripheral rectangle RP and a lower-case "o" may be displayed by energizing the 14 segments defining the periphery of one of the lower quadrants Q. A numeral zero "0" could be distinguished from a capital letter "O" by, for example, not energizing the corner segments 111, 119, 171, 179, or by energizing a central segment, e.g., segment 145. Alternatively, for example, zero may be represented by energizing the 14 segments 115-175, 119-179 disposed along the central vertical bisector and along the right side RS of rectangle RP and also energizing the six additional segments 116-118 and 176-178 on the right portion of top and bottom sides TS, BS, thereof.

As a further example, a capital "Z" may be displayed by energizing the 18 segments 111-119 and 171-179 along the top and bottom sides TS, BS of rectangle RP and the seven segments 122, 123, 134, 145, 156, 157, 168 along the diagonal between upper right corner 179 and lower left corner 111 thereof. A lower-case "z" may be displayed by energizing the five segments (e.g., segments 115-119 and 145-149) along each of the top and bottom sides of a lower quadrant Q and the three segments (e.g., 126, 127, 138 along the diagonal between the upper right corner and the lower left corner thereof.

In addition, certain plural character combinations may be displayed by a single character display 10, such as displaying the numerals 11-19 by illuminating all of the segments 111-171 disposed along the left side LS to display the numeral "1" and illuminating selected ones of segments 115-179 disposed along the peripheries of the upper and lower right quadrants Q and disposed interior thereto to display the second numeral 1-9.

Figure 2:
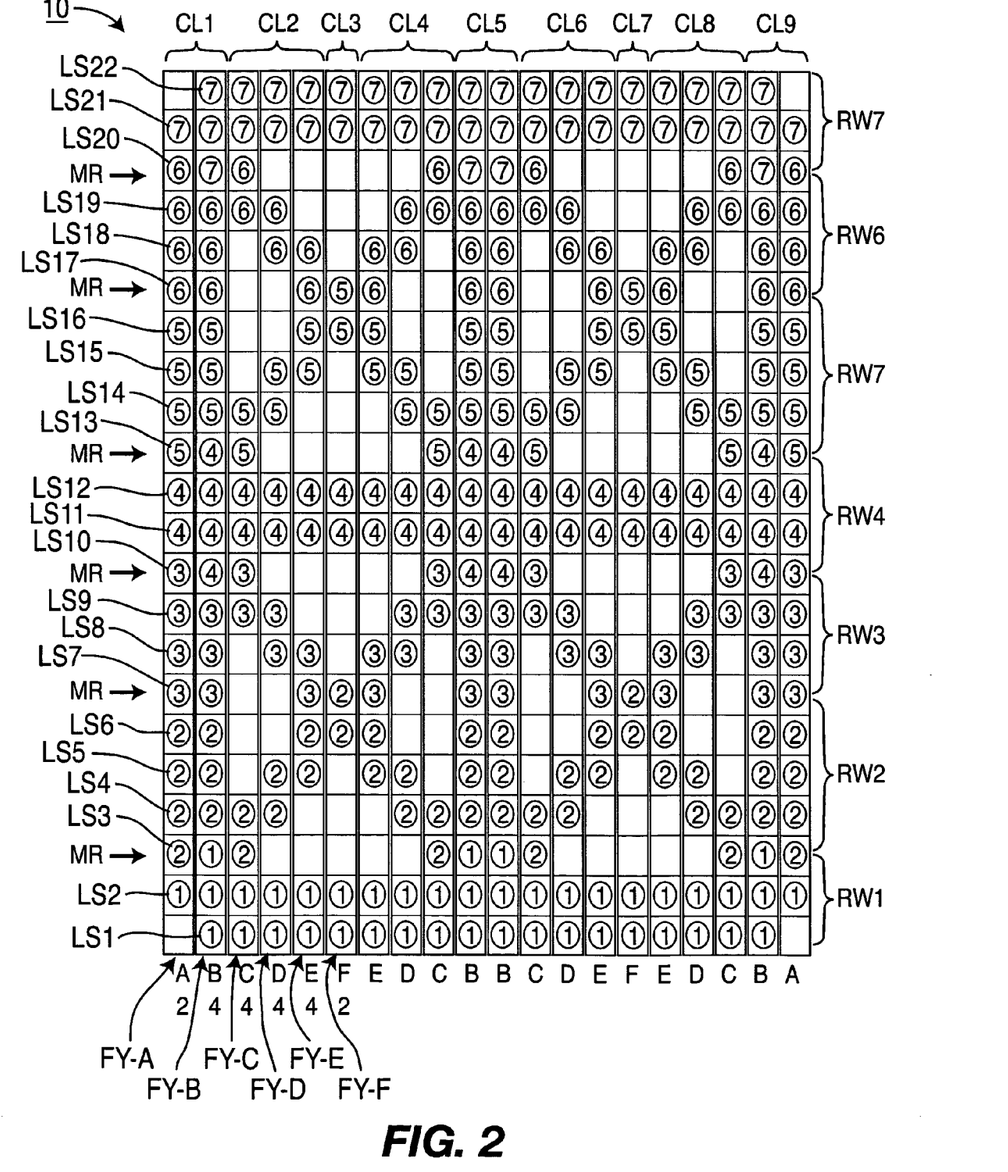
FIG. 2 is a schematic diagram of an example embodiment of the 59-segment display of FIG. 1 including light sources arranged in rows and columns.

FIG. 2 is a schematic diagram of an example embodiment of the 59-segment display 10 of FIG. 1 including plural light sources arranged in nine columns CL1-CL9. The light sources LS (illustrated by circles) are disposed on sets on strips FY arranged side-by-side from top to bottom in the FIGURE, wherein one or more of selected types of strips FY comprise each of nine columns CL1-CL9. Strips FY are of several "types" described below, and designated as types A, B, C, D, E and F along the lower portion of FIG. 2. Strips FY of types A, B, C, D, E and F are herein referred to as strips or functional yarn FY-A, FY-B, FY-C, FY-D, FY-E and FY-F, respectively.

As illustrated, 20 strips FY comprise display 10, of which are two each of strips FY of type A and type F, and four each of strips FY of types B, C, D and E. Each strip FY has 22 light source LS positions, not all of which may be utilized on every strip FY. If all positions were to have a light source LS, then a 20×22 light element display 10 is provided. These 440 light sources (e.g., LEDs) are connected in 63 addressable segments, i.e. with seven addressable segments (of one to four LEDs each) on each strip FY. In one preferred embodiment, only 316 of the possible 440 LED positions have an LED thereat. These 316 LEDs are connected in 59 addressable segments, i.e. with seven or fewer addressable segments (of one to four LEDs each) on each strip FY. Other embodiments may be desired, e.g., for obtaining another 59-segment display or another display arrangement.

The twenty strips FY are associated with nine columns CL wherein each column may include one, two or three strips FY. Columns CL1 and CL9 each may comprise one type A strip FY-A and one type B strip FY-B. Columns CL2, CL4, CL6 and CL8 each may comprise one type C strip FY-C, one type D strip FY-D and one type E strip FY-E. Columns CL3 and CL7 each may comprise one type F strip FY-F, and column CL5 may comprise two type B strips FY-B. Thus, only six different types of strip FY are employed to provide the 20 strips FY comprising the nine columns CL1-CL9 of 59-segment character display 10. Strips FY in a given column may be addressed in the same manner so that only nine column groups need be addressed to energize any combination of the 59 segments.

Types A-F of strips FY are defined by the number and connection of light sources LS disposed thereon. As illustrated, up to 22 light sources LS may be disposed on each strip FY, however, except for strip FY type B, less than 22 light sources LS are provided. Light sources LS on each strip are grouped into seven or fewer groups thereby to define seven or fewer segments corresponding to rows RW1-RW7 described above, and the seven rows or segments are designated in FIG. 2 by the small numeral within each circle representing a light source LS. As illustrated, strips FY of types A-E each have seven independently addressable segments, and strip FY of type F has five independently addressable segments, wherein each independently addressable segment corresponds to a defined row RW.

In the example embodiment illustrated, all the types of strips FY include seven segments (groups) of light sources LS except for the type F strip FY which may include only five segments (groups). In general, a display may comprise plural strips FY having the same number of groups of light sources LS (e.g., arranged in seven segments) or may have one or more strips FY comprising fewer than seven segments. One factor affecting the number of segments may be manufacturing cost, e.g., considering the benefit of having all strips FY the same (and more complex) versus the cost savings from using fewer components on certain ones of the strips FY and manufacturing a plurality of (e.g., six) different types of strips FY. In addition to the cost of components, the costs of different versus identical pick-and-place patterns, different versus identical substrates, one type versus six types to handle and inventory, also may affect the overall manufacturing cost.

Each light source LS is typically provided by one or more light-emitting diodes (LEDs) mounted to strip FY and selectively energized by conductors and circuits thereon. Preferably, strip FY includes an electronic substrate on which are formed patterned conductors to which the LED light sources LS connect for selectively receiving electrical power. Typically, as described below, strip FY also includes integrated circuits and/or transistors for selectively applying electrical power to the LEDs for selectively energizing the LEDs to cause them to selectively produce light.

Placement of LEDs D1-D22 on each functional yarn FY in light source positions LS1-LS22 may be selected to make the characters displayed appear more aesthetically pleasing. Thus, the omission of light sources LS1 and LS22 from functional yarn FY-A leaves the four extreme corner positions vacant so that the shorter segments 111, 119, 171, 179, provided by three light sources at each corner when illuminated appear more rounded rather than rectangular. Further, certain ones of light sources LS may be assigned to selected segments to also avoid a squared appearance.

For example, certain rows of light sources LS may be designated as "mixed rows" MR wherein the light sources LS (LEDs) therein comprise a mix of LEDs from two adjacent segments or rows, e.g., for providing an appearance of rounded ends for certain segments. For example, in the "mixed row" MR including light sources LS connected in display rows RW1 and RW2, light sources LS3 of functional yarn FY-B of columns CL1, CL5 and CL9 are energized in the segment of row RW1 and light sources LS3 of functional yarn FY-A and FY-C of columns CL1, CL2, CL6, CL8 and CL9 are energized in the segment of row RW2. Similarly, in the "mixed row" including rows RW3 and RW4, light sources LS7 of functional yarn FY-B of columns CL1, CL5 and CL9 are energized in the segment of row RW4 and light sources LS7 of functional yarn FY-A and FY-C of columns CL1, CL2, CL6, CL8 and CL9 are energized in the segment of row RW3.

While these mixed rows MR serve to simplify the circuitry for energizing light sources LS and in certain cases may improve the aesthetics of particular characters of the font, certain of these mixed rows MR may be considered introduce a "defect" (e.g., undesired shape) into the font. The light sources LS of any or all of these mixed rows MR could be energized independently rather than as part of an adjacent row RW, if desired. E.g., as shown, rows LS7 and LS17 are not considered to introduce a defect whereas rows LS3, LS10, LS13 and LS 20 are considered to introduce a defect into the font.

It is noted that while a preferred example display 10 is described in terms of "strips" and/or "functional yarn," a physical embodiment of a display 10 as described above may be provided on one or more substrates.

Figure 3:
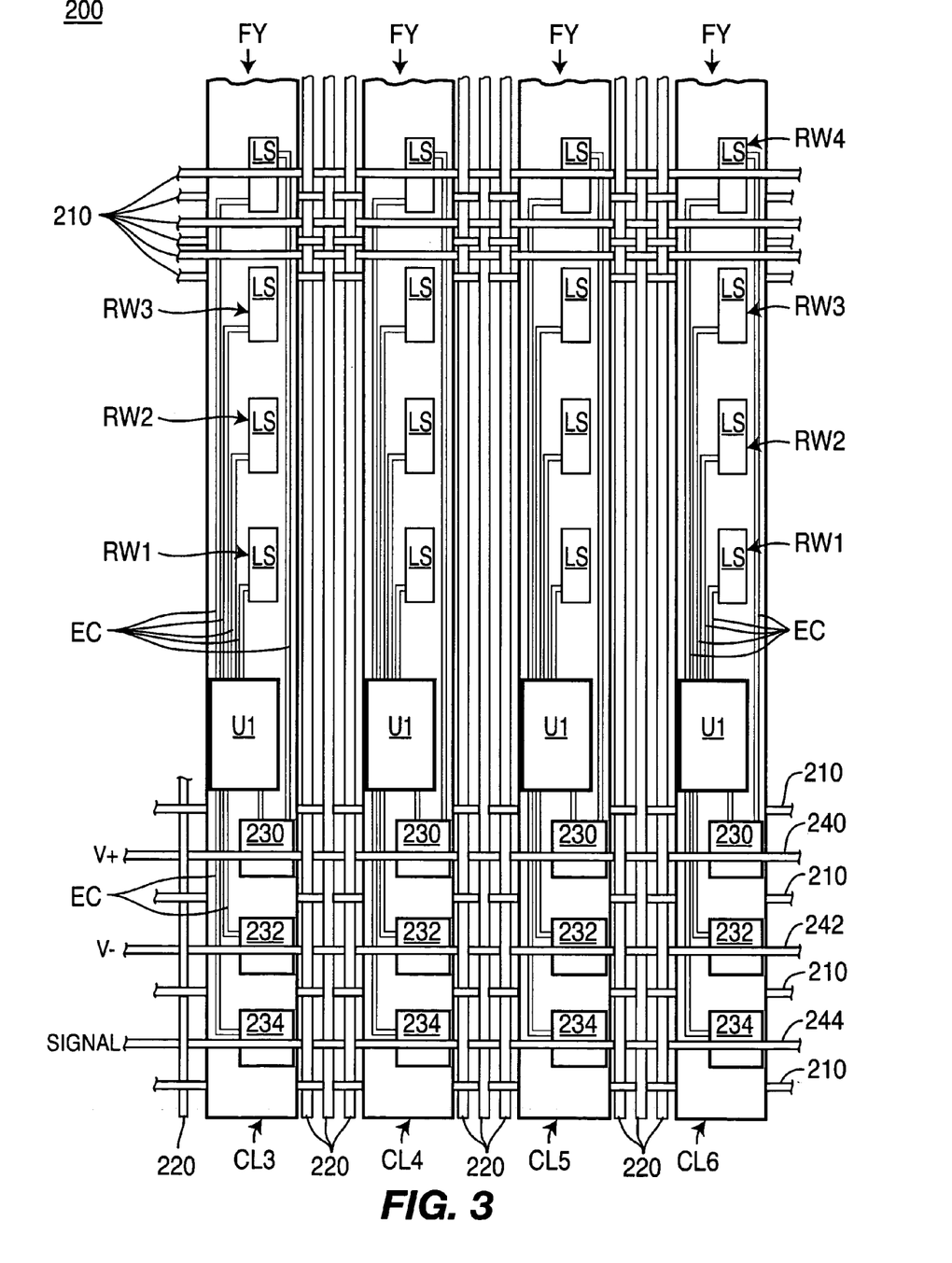
FIG. 3 is a schematic diagram of a portion of an example woven article embodiment including at least a portion of a segment display including functional yarn having light sources arranged thereon to provide rows and columns of light sources.

FIG. 3 is a schematic diagram of a portion of an example woven article embodiment 200 including at least a portion of a segment display 10 including plural strips FY that are "functional yarn" having light sources LS arranged thereon to provide rows and columns of light sources. Functional yarn FY are interwoven with insulating yarn 210 in one of the warp and the weft, and with insulating yarn 220 in the other of the warp and the weft. Interwoven in article 200 are electrically conductive yarn 240, 242, 244 preferably in a direction transverse to the direction of functional yarn FY. Functional yarn FY are arranged adjacent each other, i.e. in side-by-side arrangement, and may be woven in either the warp or the weft of article 200, but are preferably woven in the weft.

"Functional yarn" FY is yarn including certain elements and/or devices for performing a function electrically or electronically. Specifically, functional yarn FY is yarn suitable for weaving and comprises a substrate that has electronic conductors and electronic devices thereon for performing a circuit function. Electronic devices may include resistors, capacitors, inductors, diodes, transistors, hybrid circuits, integrated circuits, devices including combinations thereof, and other electronic devices. Typically, one or more of the electrical conductors EC thereon provide one or more contact sites (contacts), e.g., contacts 230, 232, 234, at which electrical connection can be made with the electrical circuit(s) of functional yarn FY, e.g., for applying electrical potential or current thereto and/or for communicating signals to or from functional yarn FY.

Examples of functional yarn, textiles, woven articles, and a method for weaving textiles and woven articles including functional yarn, and addressing thereof, are described in U.S. patent application Ser. No. 10/366,441, filed Feb. 13, 2003 by Ian G. Hill et al, entitled "WOVEN ELECTRONIC TEXTILE AND ARTICLE," which is U.S. Patent Publication 2004/0009729 published Jan. 15, 2004, which are hereby incorporated herein by reference in their entirety.

In the article 200 illustrated, which may be part of a larger article, four functional yarn FY disposed adjacent each other are separated from each other by three insulating yarn 220 all lying in the same direction, i.e. side by side. Insulating yarn 210 are interwoven transversely to functional yarn FY and insulating yarn 220. Electrically conductive yarn 240, 242, 244 are interwoven transversely to functional yarn FY and insulating yarn 220 in positions to overlie contact sites 230, 232, 234, respectively, of each functional yarn FY, and are separated from each other, and are electrically isolated from each other, by one or more insulating yarn 210.

The spacing between adjacent functional yarn FY (i.e. the "pitch" thereof) may be defined by the number of insulating yarn 220 woven therebetween and/or the width or diameter thereof, as well as by the tightness of the weave. Similarly, the spacing between adjacent electrically conductive yarn 240, 242, 244 (i.e. the "pitch" thereof) may be defined by the number of insulating yarn 210 woven therebetween and/or the width or diameter thereof, as well as by the tightness of the weave.

The example functional yarn FY illustrated has three electrical contact sites (contacts) 230, 232, 234, proximate one end thereof, however, electrical contacts may be provided at or near one or both ends of functional yarn FY and/or at one or more locations intermediate its ends. Contacts 230, 232 may be for receiving electrical potential, e.g., with relatively positive potential V+ applied at contact 230 via conductive yarn 240 and with relatively negative potential V− applied at contact 232 via conductive yarn 242. Either one thereof may be considered as a reference potential, e.g., "ground" potential. Contact 234 may be for receiving an electrical signal via conductive yarn 244, e.g., a signal or signals for actuating and/or otherwise controlling one or more functions that may be preformed by the electrical circuit of functional yarn FY. In the example embodiment described, contact 234 receives via conductive yarn 244 an addressing signal that identifies a particular one or ones of functional yarn FY and that provides instructions for controlling the illumination of selected light sources LS on the addressed functional yarn FY.

Examples of suitable electrically conductive and electrically insulating yarn are also described in U.S. Patent Publication 2004/0009729. Examples of preferred electrically conductive yarn, e.g., yarn 240, 242, 244 may include copper wire as well as braided or woven copper wire, such as a coaxial cable braided outer conductor or Litz wire where the current to be carried is of significant amperage. Two or more electrically conductive yarn may be woven contiguously for obtaining higher current-carrying capacity.

An integrated circuit U1 receives electrical potential and addressing signals via electrically conductive yarn 240, 242, 244, electrical conductors EC, and contacts 230, 232, 234, respectively. Circuit U1 decodes the addressing signals, and provides electrical signals responsive to the decoded addressing signals via various other electrical conductors EC for controlling the activation of various ones of light sources LS thereon. Each light source LS is connected, e.g., to receive potential V+ via an electrical conductor EC from contact 230 and to selectively receive a less positive actuating potential via an electrical conductor EC from integrated circuit U1.

As illustrated, woven article 200 includes rows RW1-RW4 and columns CL3-CL6 of a row-column matrix display. As illustrated, each functional yarn FY provides one column and includes four light sources LS identified to respective rows RW1-RW4 of a display 10, however, additional light sources, e.g., three light sources LS for rows RW5-RW7, of a display not shown.

Addressing signals may be communicated serially via conductive yarn 244 and contacts 234 to integrated circuits U1 on each of the functional yarn FY. The addressing signals may include an address portion and a control portion, and may include a synchronization portion and a verification portion such as a parity check and the like. The integrated circuit U1 of each functional yarn FY may have a unique address or identifying number associated therewith, e.g., as by programming into a ROM, PROM, EEPROM, or other memory therein or associated therewith. If the addressing signal contains the unique address or unique identifying number of a particular integrated circuit U1, then that integrated circuit U1 responds to its own address or identifying number to store (latch) the control signal portion associated therewith, while ignoring addressing signals containing other addresses or identifying numbers. Such circuit is sometimes referred to as an addressable latching decoder or ALD.

In response to the stored control signal addressed to it, each integrated circuit U1 decodes the associated control signal for performing the function represented thereby. For illustrated functional yarn FY, that response includes turning on and turning off various ones of light sources LS on that functional yarn FY, either for a given time or until a subsequent addressing signal containing a different control signal is received. Light sources LS may simply be turned on and off, thereby to provide the desired illuminated message. In the illustrated embodiment, integrated circuit U1 is preferably an addressable latching seven-segment decoder, e.g., for operating a display 10 as illustrated in FIGS. 1A-1B and 2.

Alternatively, the light sources LS of each segment may be turned partially on in a controlled manner, e.g., as by applying a reduced potential or a pulse-width or other time modulated potential thereto, or by controlling the current flowing therethrough, so as to controllably provide light at a desired level, e.g, at a level between 0% and 100% of the fully-energized light output. As a result, a display 200 can provide a gray-scale pattern so as to display images as well as characters. Where a graphics display is desired, each functional yarn preferably includes a full complement of light sources LS and further preferably, each light source LS is independently controllable via the action of an addressable latching decoder U1. Such display would be suitable, e.g., to display a scrolling character message not possible on the particular display illustrated in FIG. 2 which has less than the full complement of light sources LS.

The woven article 200 of FIG. 3 illustrates a portion 200 of a character, e.g., of a character display 10 as illustrated in FIGS. 1A, 1B and 2. Character display 10 may be woven as individual characters that are later assembled into a display having plural characters, or may be woven in a long fabric including many characters 10. In such arrangement, which is presently preferred, functional yarn FY are woven into the weft and electrically conductive yarn 240, 242, 244 are woven into the warp, and so the length in the warp direction may be as long as the warp yarn permit, which could be hundreds of meters or more.

Spacing between adjacent characters 10, 200 may be provided by regions having a number of insulating weft yarn 220 woven therein, i.e. a number greater than the number of insulating weft yarn 220 between adjacent functional yarn FY of a character display 10. The number of insulating yarn 220 selected to provide a desired spacing given the diameter/width of the weft yarn and/or the tightness of the weave. Displays having any desired number of characters 10, 200 may then be provided by cutting a length of the woven display that includes the desired number of characters, typically cutting across the warp yarn in one of the spaces between adjacent character displays 10, 200.

Further, punctuation such as a period, comma, semicolon, colon or hyphen, for example, may be provided in a fixed position by functional yarn FY woven in the weft in any one or more of the spacing regions between adjacent characters 10, 200, e.g., with insulating weft yarn to both sides thereof for a desired spacing of the punctuation mark from the adjacent characters 10, 200, in the desired position. Typically, only one or two adjacent functional yarn FY would be sufficient to provide a punctuation mark, and each would need to have only those light sources LS in one or a few rows RW operable, and so would only require a few of LEDs D1-D22.

While the foregoing arrangement may be preferred, other arrangements of woven character displays as described could be provided. For example, a set of five strips each having seven LED segments thereon could be employed to provide a 5×7 element matrix character display, or seven strips each having nine LED segments could provide a 7×9 element matrix display; or any other desired character display arrangement may be provided by selecting the number of strips and light source arrangement thereon. A 5×7 element matrix character display would require only 35 LEDs, i.e. seven on each of five independently addressed functional yarn FY. More aesthetically pleasing characters, e.g., characters appearing to have rounded corners, can be provided by additional LEDs in any of the described character displays, of which display 10 of FIG. 2 is an example.

Figure 4:
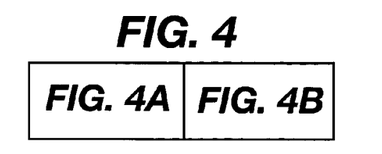
FIG. 4, shown on two sheets designated as FIG. 4A and FIG. 4B, is a schematic diagram of an example circuit suitable for a functional yarn, such as that shown in FIG. 3.
Figure 4A:
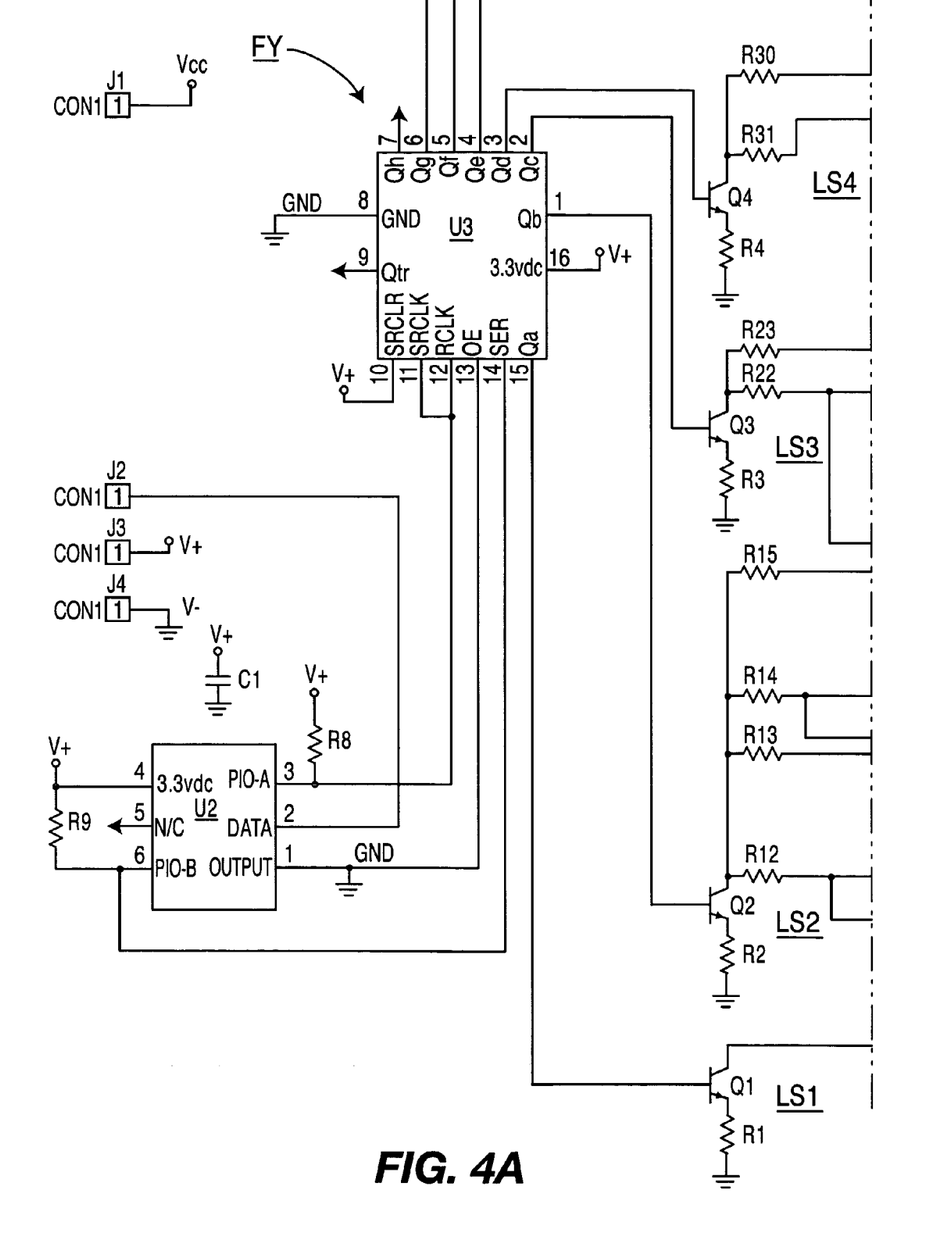
Figure 4B:
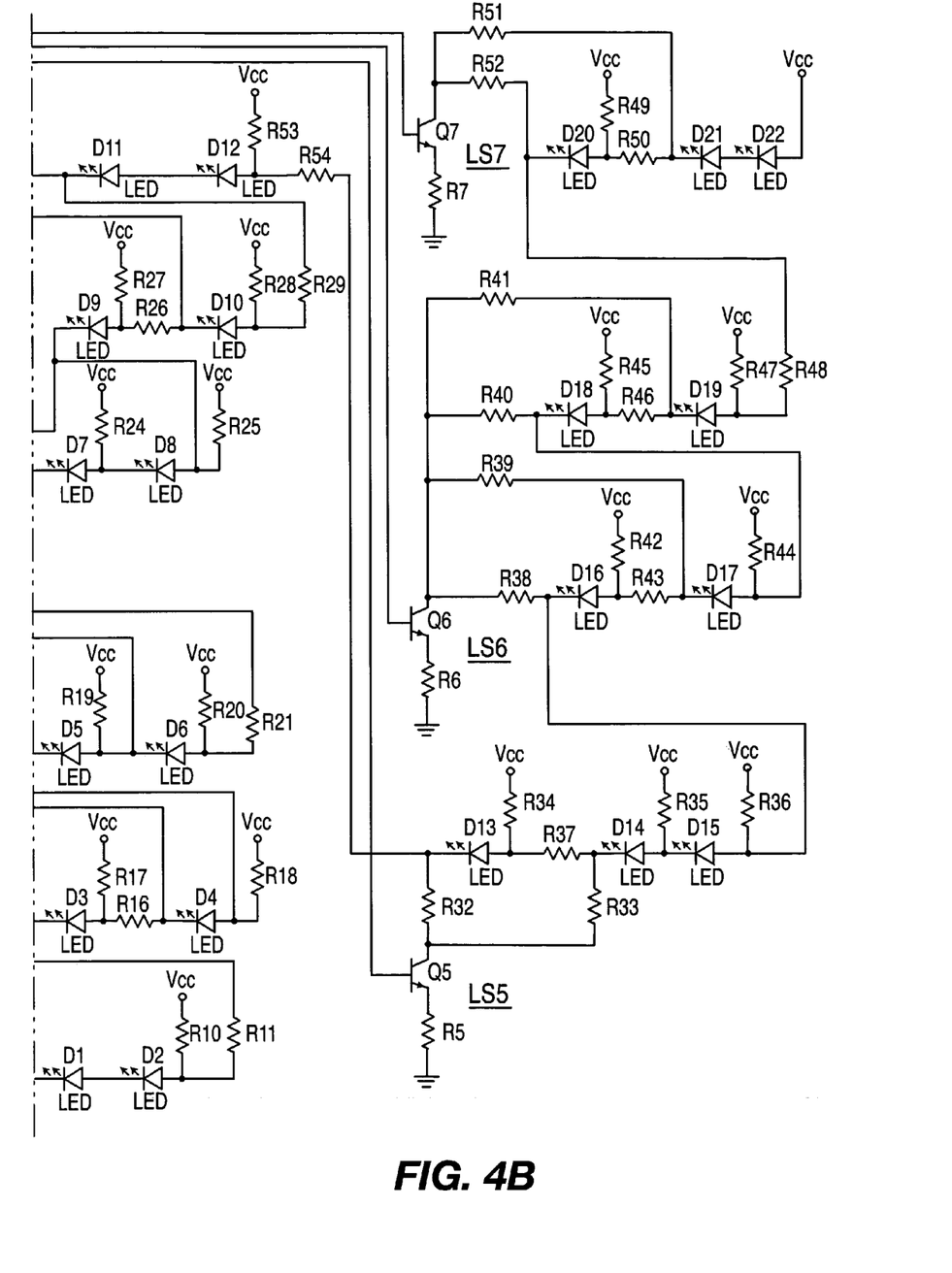

FIG. 4 is a schematic circuit diagram of an example circuit suitable for an electrically functional yarn FY, such as that shown in FIG. 3. A functional yarn substrate providing an electrical conductor pattern for realizing this example circuit when all the illustrated electrical components are mounted thereon is also suitable for providing several different types of functional yarn FY, e.g., simply by omitting selected ones of the resistors and LEDs shown and by appropriately selecting the values of certain resistors, e.g., including to provide a short circuit (zero ohm value, as by providing a jumper wire).

The addressing, latching and decoding functions of circuit U1 described herein are provided by integrated circuits U2 and U3. Integrated circuit U2 may be an addressable switch that receives addressing signals at data pin 2 and provides signals at output pins PIO-A and PIO-B responsive to the addressing signals. Integrated circuit U3 may be a latched shift register that provides outputs for driving the seven-segments of LEDs responsive to signals PIO-A and PIO-B from integrated circuit U2 for selectively actuating ones of transistors Q1-Q7 which correspond to the seven display segments. Segment transistors Q1-Q7 when actuated selectively energize ones of LEDs D1-D22 for producing light from selected ones of the seven segments LS1-LS7.

Each of the seven segments is controlled by a respective drive transistor Q1-Q7 and may include one, two, three or four LED light sources including ones of LEDs D1-D22. Resistors R1-R54 have resistance values selected to provide the desired current flow in the present ones of LEDs D1-D22 and for biasing integrated circuit U2. Resistance values may range between zero ohms, e.g., a wire jumper, and an open circuit provided by an omitted resistor, however, in a typical example circuit most resistance values are between zero and 200 ohms, while biasing resistors, e.g., R8, R9, are typically greater than about 1000 ohms, e.g., in the range of about 1000 to 10,000 ohms, to "pull up" the voltage at the input terminals of integrated circuit U3. Typically, resistors R1-R7 connected to the emitters of transistors Q1-Q7 are about 200 ohms for setting a desired current level of about 20 ma for the ones of LEDs D1-D22 that are present given the typical output voltage of about 4.7 volts provided at the output terminals of integrated circuit U3.

Resistors R10-R54 in the collector circuits of Q1-Q7 may be omitted (i.e. provide a relatively high resistance value (e.g., open circuit)) or may be a very low resistance value (e.g., wire jumper) for determining which of transistors Q1-Q7 energize certain ones of LEDs D1-D22 which are provided to provide the desired functionality (e.g., type A through F) of a yarn FY. In addition, ones of LEDs D1-D22 may be omitted or may be replaced by a low resistance value, e.g., a wire jumper, for selecting which of LEDs D1-D22 are energized by which one of transistors Q1-Q7.

The circuit of FIG. 4 is suitable for use in any of the type A through type F types of functional yarn FY-A through FY-F described above, wherein the type (or functionality) of a functional yarn is defined by the ones of the LEDs D1-D22 that are included thereon. For purposes of description, consider the 22 light source positions in each of the 20 columns CL of display 10 of FIG. 2 as being numbered from number 1 at the bottom of the Figure to number 22 at the top of the Figure, corresponding to LEDs D1-D22, respectively. Then, e.g., a type A functional yarn FY-A would include LEDs D2-D21 and would include a zero-ohm resistor in the places of LEDs D1 and D22. Resistors R10, R12, R16, R20, R22, R26, R28, R30, R32, R37, R39, R42, R46, R48, R49, R51 and R53 thereof are zero-arm resistors, and resistors R11, R13, R14, R15, R17, R18, R19, R21, R23, R24, R25, R27, R29, R31, R33, R34, R35, R36, R38, R40, R41, R43, R44, R45, R47, R50, R52 and R54 are omitted. Further, a type B functional yarn FY-B would include LEDs D1-D22, a type C functional yarn FY-C would include LEDs D1-D4, D9-D14 and D19-D22 and would omit LEDs D4-D8 and D15-D18, and so forth. Thus the display 10 which has 20×22=440 possible light source positions may provide a versatile character display utilizing only 316 LEDs D1-D22 in 316 selected positions.

Suitable electronic devices include, for example, for device U2 a type DS2406 dual addressable switch plus 1 K-bit memory integrated circuit available from Maxim Integrated Products, Sunnyvale, Calif. and Dallas Semiconductor, Dallas, Tex., and for device U3 a type SN74LV595ARGYR latched shift register available from Texas Instruments, Dallas, Tex. Transistors Q1-Q7 may be any general purpose NPN transistor of which a type FMMT449SOT NPN transistor is an example. Suitable LEDs are available from several commercial sources including, for example, types LTST-C150KRKT, LTST-C150KYKT, and LTST-C150KGKT, which are red-light emitting, amber-light emitting and green-light emitting LEDs, respectively, available from Lite-On Technology Corp. located in Taipei, Taiwan. One or more capacitors, e.g., C1, may be provided for filtering the power source potential.

While only a single source of electrical power is necessary to operate a functional yarn FY in a display as described, it may be desirable in certain instances to provide electrical power at more than one potential. In the illustrated circuit of FIG. 4, for example, electrical power may be provided at a relatively higher voltage designated Vcc for operating LEDs D1-D22, e.g., at about +12 volts, and at a lower potential designated V+ for operating integrated circuits U2 and U3, e.g., at about +3.3 volts DC with respect to ground potential designated as V− or GND. Typically, all of the LEDs D1-D22 in any given segment are connected in series and are energized together, e.g., from potential Vcc, however, any suitable combination of series and parallel connected LEDs may be utilized.

Thus, each functional yarn FY preferably includes an addressable latched driver (ALD) integrated circuit U1 (e.g., FIG. 3) that has a unique address or identifier by which it can be addressed and by which control signals for the elements on the functional yarn FY may be communicated to it. Integrated circuit U1 performs comparable functions to those described herein in relation to integrated circuits U2/U3. Preferably, integrated circuit U1 includes circuitry for recognizing its address or identifier, and then responding to the signal or signals associated therewith for selectively energizing ones of the LEDs D1-D22. Most preferably, integrated circuit U1 also includes the transistors Q1-Q7 and the resistors R1-R7, or the equivalents thereof, for providing a controllable current drive to LEDs D1-D22.

Each ALD circuit U1/U2/U3 responds to a serially applied addressing signal data stream SIGNAL that contain its address or identifier to receive and decode the addressing signal for turning on and/or turning off (in whole or in part) the LEDs of the particular segments included thereon. Each segment may include one or more light sources, e.g., LEDs D1-D22, arranged in a number of segments, e.g., seven or less, that can be independently controlled by the ALD circuit U1/U2/U3, e.g., with each segment connected to a different output of the ALD circuit U1/U2/U3.

Figure 5:
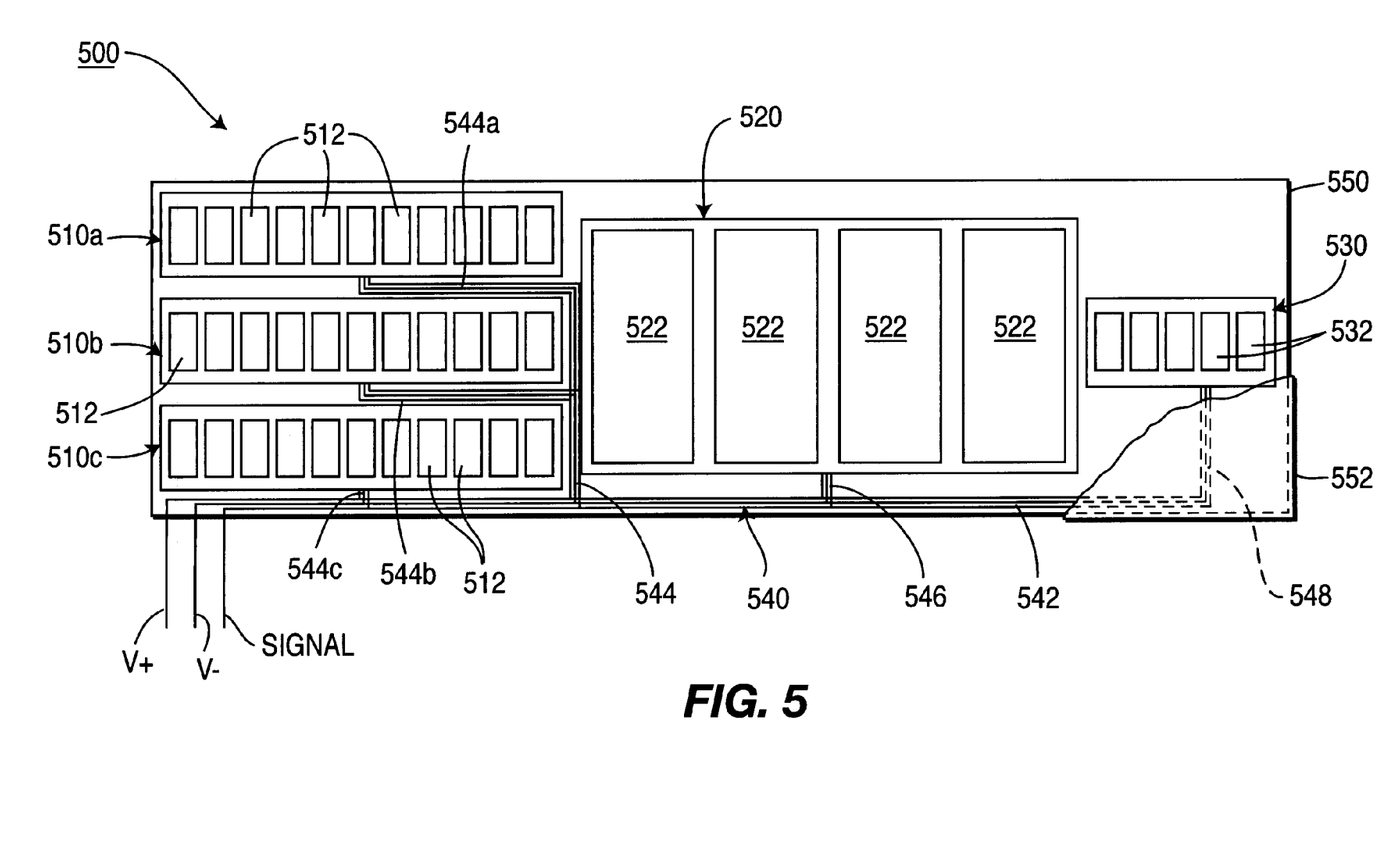
FIG. 5 is a schematic diagram of an example display including plural woven articles providing character displays.

FIG. 5 is a schematic diagram of an example display 500 including plural woven articles 510, 520 530 providing character displays 512, 522, 532. Each of woven articles 510, 520, 530 comprises a length of woven fabric including a plurality of woven character displays 512, 522, 532, e.g., of the sort described in relation to FIGS. 1A-1B, 2 and 3 above. Each has functional yarn FY woven therein as described above and is addressable via electrical conductors thereof, e.g., conductors 240, 242, 244 disposed proximate a bottom edge thereof.

Plural displays 510a, 510b, 510c of like type may be of the same type of display 510. E.g., displays 510a, 510b and 510c may be lengths of woven display cut from a longer length of woven display 510. Display 520 may be, e.g., a length of woven display 520 cut from a longer length of a relatively larger woven display 520. Display 530 may be, e.g., a length of woven display 510 cut from a longer length of a woven display 530 (or may be a length of woven display 510 cut from a longer length of woven display 510 if the desired characters 532 are the same size as characters 512). Alternatively, any one or more of displays 510, 520, 530 may be woven with the length, width and number of character areas 512, 522, 532 appropriate for a given display 500, or any one or more of characters 512, 522, 532 may be woven as individual characters.

In a preferred arrangement, lengths of displays 510, 520 and 530 are cut from longer lengths of woven displays 510, 520, 530 and are assembled onto a backing substrate 550, e.g., by being sewn and/or adhesively attached and/or thermally welded thereto. As a result, a display 500 of relatively large size may be provided from a few standardized display components 510, 520 that can be manufactured in greater quantity and at a relatively lower per unit cost. This simplifies the weaving of the display elements 512, 522, 532 as compared to the direct weaving of a complete display 500, e.g., by reducing the number of types of functional yarn FY needed and needing to be handled and organized for weaving. Substrate 550 is preferably a fabric so as to have drape and ease as do the component displays 510, 520, 530, e.g., for easy foldability and storage.

Display 500 may also include an optional fabric substrate 552 overlying substrate 550 and displays 510, 520, 530 and having openings through which the characters 512, 522, 532 thereof may be viewed. Such overlying substrate 552 is typically a fabric covering that hides from view the electrical conductors 540 and the edges of displays 510, 520, 530, e.g., for providing a more "finished" appearance or other aesthetic reasons. Alternatively and optionally, fabric substrate 552 may be utilized in place of (without) substrate 550, in which case whatever is described as being attached to substrate 550 would be similarly attached to cover substrate 552.

Either backing substrate 550 or cover substrate 552, or both, may be referred to as a common substrate because it may be common to each of a plurality of displays 510, 520, 530, e.g., any one or more of a plurality of displays 510, 510a, 510b, 510c, 520, 530 may be attached thereto or supported thereby.

Electrical conductors 540 receive and distribute electrical power V+ and V− to the various displays 510, 520, 530 and also communicate addressing signals SIGNAL thereto. The electrical conductors 540 include a set of three parallel conductors having various branches for each of displays 510, 520, 530. In an example arrangement, V+, V− and SIGNAL are applied to a set of three parallel conductors 542 disposed proximate the lower edge of display 500, from which they are applied to displays 510a, 510b, 510c via sets of three parallel conductors 544a, 544b, 544c, respectively, and to display 520 via a set of three parallel conductors 546, and to display 530 via a set of three parallel conductors 548.

Electrical conductors 540 and the branches 542, 544, 546, 548 thereof may be woven in fabric substrate 550 or may be otherwise attached thereto, e.g., sewn and/or adhesively attached and/or thermally welded. Electrical conductors 540 and the branches 542, 544, 546, 548 thereof include three conductors that connect to the electrical conductors 240, 242, 244, respectively, of each of the displays 510, 520, 530, e.g., by solder and/or electrically conductive adhesive and/or by physical contact where electrically conductive yarn in the warp and weft cross each other, for applying electrical power V+, V− and addressing signals SIGNAL thereto. Insulated crossovers of electrically conductive yarn, e.g., where branches 544b connects to branch 544 and where branches 544, 544c and 546 connect to conductors 542, may be provided by electrically insulating yarn interwoven to provide electrical isolation in the regions of such crossovers.

A display 10, 200, 500 as described herein is suitable for signage or other display application, and may be conformed to an irregularly-shaped support or object because the woven article or fabric is flexible and conformable, as is any textile i.e. it exhibits ease and drape. Further, such display may be folded, rolled up or otherwise reduced in size for convenient storage and/or shipping. Because the display 10 arrangement is suitable for fabrication on a loom, including a modern, high-speed, programmable loom, electronic signs and other displays may be made in relatively high volume and at relatively low cost.

Further, the addressable features described herein provide for woven/fabric displays to be manufactured in relatively long lengths and then cut to a desired length and/or size, and either utilized as is or be sewn or otherwise assembled with other similar displays, as may be desired. In addition, because the described display is addressable and/or programmable, e.g., using a laptop computer, it is suitable for displaying a static or periodically changing message that a user might desire to display. Further, because the addressing may be programmed after the display or elements thereof have been fabricated, the fabricated woven display elements may be interchangeable until they are committed to a particular display or usage, thereby to reduce the relative level of inventory desired to meet various levels of customer demand for such displays.

Figure 6A:
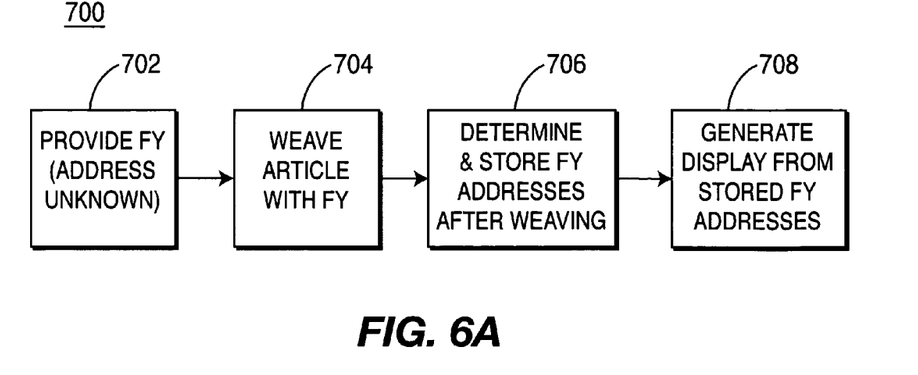
FIGS. 6A, 6B and 6C are schematic diagrams of an example method for providing an addressing protocol suitable for use with the example displays of FIGS. 1-5.
Figure 6B:
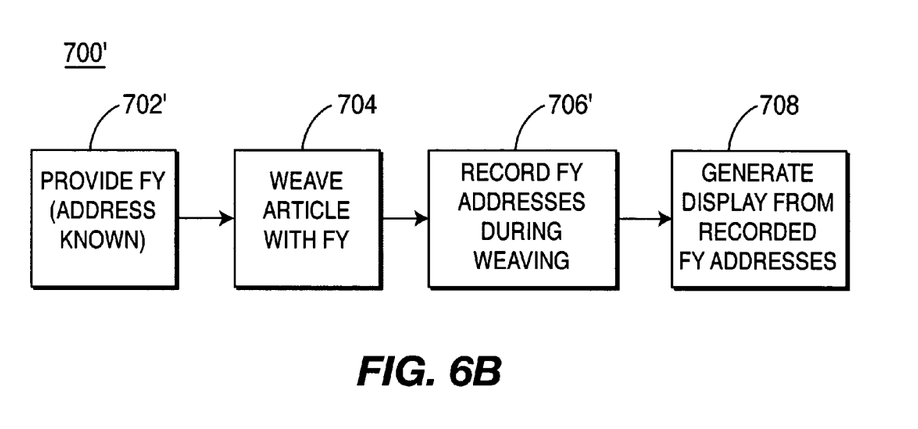
Figure 6C:
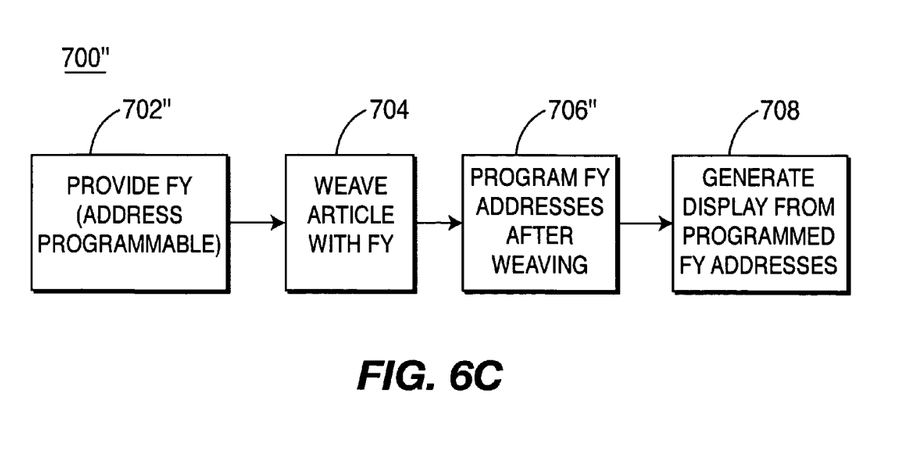

FIGS. 6A, 6B and 6C are schematic diagrams of an example method 700, 700', 700" for providing an addressing protocol suitable for use with the example displays 10, 200, 500 of FIGS. 1-5. and are described in general and specifically in the following paragraphs.

A serial addressing protocol includes at least address or identifier ID bits designated associated with particular ones of the functional yarn FY and/or characters 10, 512, 522, 532, and character data bits.

Typically, where addressing is in the manner of Table 1 below, nine bits are sufficient to define character blocks for displays of up to about 500 characters, four bits are sufficient to specify each column grouping CG, CL of nine columns, and seven bits are sufficient to specify the character data. Thus, addressing in this manner requires 20 bits for each of nine columns, or 180 bits per character. Also typically, where addressing is in the manner of Table 2 below, nine bits are sufficient to define character blocks for displays of up to about 500 characters, and six bits are sufficient to specify the character data. Thus, addressing in this manner requires only 15 bits per character.

In addition, the foregoing character identifier and data bits may be preceded by synchronizing bits, and may be followed by parity or other error checking bits, and an end-of-data sequence series of bits, as may be necessary or desired in the case of a particular type of addressable electronic device selected.

The addressing protocol word preferably includes at least an address for an ALD circuit U1/U2/U3 and character data defining the segment or segments, e.g., the LEDs, of a particular functional yarn FY and/or column that are to be turned on or turned off. Where the LEDs may be partially turned on, the addressing protocol word also includes data characters indication the level (e.g., percent on) for each LED segment. In addition, the addressing protocol word also preferably includes error checking and/or correcting bits, and may also include synchronization bits and/or beginning-of-word and/or end-of-word indicating bits. Addressing protocol words are typically transmitted serially on the addressing conductor SIGNAL at a rate compatible with the electrical characteristics thereof. Faster addressing may be provided by employing plural serial and/or parallel addressing conductors.

Each ALD U1/U2/U3 compares the address data or identifier ID of each addressing protocol data word to its own address or identifier ID and, if a match is found, it then passes the accompanying character data stream to its internal current driving circuitry. If the serial addressing data word contains the address or ID of an ALD U1/U2/U3, then that ALD latches the character data in its storage registers and applies appropriate electrical signals to its current driving circuitry to apply an appropriate current to the LEDs in the segment that are to be energized in accordance with the character data word. This driving condition is maintained until a different current driving instruction is received via a subsequent addressing signal containing the ALD U1/U2/U3 address or identifier ID. In the example embodiment described, the current driving signals are suitable for a seven-segment LED driver arrangement.

It is noted that the address or identifier ID of each ALD integrated circuit disposed on a functional yarn FY may be programmed or otherwise associated with the ALD integrated circuit prior to its being associated with and attached to a particular functional yarn FY, e.g., in its manufacture and/or testing. In such case, the address or identifier ID of each functional yarn FY would likely be determined after a functional yarn FY has electrical and electronic components thereon, e.g., for each completed functional yarn FY. When the functional yarn FY are incorporated into a display, e.g., are woven into a woven article comprising a display 10, 200, 500, the addresses or identifiers ID of each functional yarn FY may be provided to or may be obtained by the display driver software that will control the message to be displayed by the display 10, 200, 500, e.g. from a laptop or other computer. The display driver software then sorts and/or organizes the address associated with each functional yarn into the characters comprising the display and into the column groups thereof.

In the example of method 700 illustrated in FIG. 6A, the address of each of the ALD circuits U1/U2/U3 of each functional yarn FY is predetermined when the functional yarn FY is provided 702 for weaving, but the value thereof is unknown, e.g., at the time of weaving. The functional yarn FY are woven 704 into a woven article in a correct sequence of types of functional yarn FY to provide the desired character display 10, 200, 500 arrangement as described. At the completion of weaving, the addresses of the functional yarn FY in the character(s) of the display remain unknown.

After weaving, the address of each functional yarn is determined 706 and the value thereof is stored 706 in association of the physical position of the functional yarn FY in the woven article. Typically, such determination 706 may be made by probing each functional yarn FY, e.g., by applying a sequence of possible addresses and observing or measuring which functional yarn FY responds to each particular address by illuminating one or more of its segments as commanded, until all possible addresses and/or all functional yarn FY have been tested. A list or table of the addresses and the physical location or order of the functional yarn FY in each character of a display 10, 200, 500, 510, 520, 530 is compiled and is stored 706 in a programming device, such as a laptop computer, that will be utilized to compose messages to be displayed. Characters may then be displayed by generating 708 appropriate addresses using the table of stored addresses to generate the appropriate FY addresses in response to the characters commanded to be displayed.

Although this aspect of method 700 substantially eases the complexity of the pre-weaving steps, it tends to require relatively difficult and/or complex post-weaving steps. Because the addressing of every display is likely to be substantially different from that of any other display, the software for generating addresses for operating any display will require the specific list or table that includes the addresses and positions or order of every functional yarn FY for that particular display.

In the example of method 700' illustrated in FIG. 6B, the address of each of the ALD circuits U1/U2/U3 of each functional yarn FY is predetermined and is known when the functional yarn FY is provided 702 for weaving. The functional yarn FY are woven 704 into a woven article in a correct sequence of types of functional yarn FY to provide the desired character display 10, 200, 500 arrangement as described. During weaving the address of each functional yarn is recorded 706' as that functional yarn is woven 704 into the woven article. Thus, at the completion of weaving, the addresses of each functional yarn FY and its position or order in the character(s) of the display is known. This may be accomplished by computerized reading and keeping track of the address of each functional yarn, e.g., the functional yarn FY are provided in a sequence of known addresses (which may or may not be sequential or in any predetermined order), or by electrically probing each functional yarn FY before or as it is woven.

At completion of weaving, the address of each functional yarn and its position or order in the character and display is known and has been recorded 706', e.g., in a list or table, e.g., in a programming device. The recorded 706' list or table of the addresses and the physical location of the functional yarn FY in each character of a display 10, 200, 500, 510, 520, 530 recorded 706' in a programming device, such as a laptop computer, may be utilized to compose messages to be displayed. Characters may then be displayed by generating 708 appropriate addresses using the table of recorded addresses to generate the appropriate FY addresses in response to the characters commanded to be displayed.

Although this aspect of method 700' is substantially more complex in the pre-weaving steps, it tends to be relatively easy in the post-weaving steps. Because the addressing of every display is likely to be substantially different from any other display, the software for generating addresses for operating any display will require the specific list or table that includes the addresses and positions of every functional yarn FY for that particular display.

Alternatively, it may be desirable that the address or identifier ID of each ALD integrated circuit be programmable after the ALD U1/U2/U3 is assembled into a functional yarn FY and the functional yarn FY has been woven into a fabric or woven article. Such programmability may be provided by connecting (shorting) or by opening a number of connections. E.g., a number of ground connections and/or fusible links may be provided that can be severed or otherwise rendered an open circuit after the functional yarn FY has been woven into a woven article comprising a display. Such connections may be severed by scribing or other mechanical means, by a laser, by an electrical current, or by another known method.

An advantage of this arrangement is that the functional yarn in a particular column grouping CL may be given the same address or identifier ID, because they will always be energized in the same manner. Where the number of characters in a display 10, 200, 500 is 500 or less, and the number of column groupings CL per character is nine or less, then the address or identifier will require fourteen or fewer bits.

In the example of method 700" illustrated in FIG. 6C, the address of each of the ALD circuits U1/U2/U3 of each functional yarn FY is not known when the functional yarn FY is provided 702 for weaving, but the value thereof is programmable, e.g., at any desired time. The functional yarn FY are woven 704 into a woven article in a correct sequence of types of functional yarn FY to provide the desired character display 10, 200, 500, 510, 520, 530 arrangement as described. At the completion of weaving, the addresses of the functional yarn FY in the character(s) of the display remain to be programmed.

After weaving, the address of each functional yarn is programmed 706" preferably in a standardized sequence or order, e.g., from a predetermined list or table of values thereof in known relation to the physical position or order of the functional yarn FY in the woven article 10, 200, 500. Typically, such programming may be by means described herein. The list or table of the addresses and the physical location of the functional yarn FY in each character of a display 10, 200, 500, 510, 520, 530 is stored 706 in a programming device, which may be a laptop computer that will also be utilized to compose messages to be displayed. Characters may then be displayed by generating 708 appropriate addresses using the predetermined list or table of addresses to generate the appropriate FY addresses in response to the characters commanded to be displayed.

An advantage of this aspect of the method 700" is that it substantially eases the complexity of the pre-weaving steps and is only moderately difficult in the post-weaving steps. A further advantage is that because the list or table of addresses is standardized and is programmed into each display, then every display may be substantially the same and may be operated by any programming device having the standardized address list or table, thereby to standardize displays 10, 200, 500 and allow relatively easy interchangeability.

As a result in each of the foregoing arrangements, the address of each functional yarn FY in woven article 10, 200, 510, 520, 530 is known in relation to its position or order in the woven article and so may be employed for generating addressing signals for addressing display 10, 200, 500, 510, 520, 530.

The addressing arrangement may take any one of several forms. Consider Table 1 which illustrates a typical set of character data commands for a single character display 10, 512, 522, 532, displaying the first character ("char 1") by specifying each column group ("CG_") into which functional yarn FY are defined and a data value ("data_") associated therewith:

TABLE 1

ALD Command without ROM

| Command | Operation |
| --- | --- |
| char 1, CG1, data 127 | All segments on |
| char 1, CG2, data 9 | Segments 1 & 4 ON, all other segments OFF. |
| char 1, CG3, data 9 | Segments 1 & 4 ON, all other segments OFF. |
| char 1, CG4, data 9 | Segments 1 & 4 ON, all other segments OFF. |
| char 1, CG5, data 9 | Segments 1 & 4 ON, all other segments OFF. |
| char 1, CG6, data 9 | Segments 1 & 4 ON, all other segments OFF. |
| char 1, CG7, data 9 | Segments 1 & 4 ON, all other segments OFF. |
| char 1, CG8, data 9 | Segments 1 & 4 ON, all other segments OFF. |
| char 1, CG9, data 127 | All segments on |

For a nine-column character format, as in the above example of Table 1, nine separate commands are required to specify the segments RW for each of the nine columns CG, CL that are to be energized for displaying the letter "A" or any other character, because each column CG, CL is addressed independently. This arrangement may add bits, e.g., 2 or 3 bits, to the address/identifier ID of the addressing word in order to specify the column group CG, CL. While this arrangement requires a relatively higher number of data bits be communicated to the various functional yarn for communicating control signals thereto, the data rate required therefor is typically attainable for a static or relatively slowly changing message, e.g., a scrolling message.

The addressing signal may be further simplified where each functional yarn FY includes a memory element, e.g., a ROM, PROM, EEPROM, into which is stored transformation data for converting a character designation (e.g., designation "32" corresponding to a letter "A" or the data value corresponding to a numeral "5") into segment designations including appropriate row RW and column CL data. The memory element may be included in the ALD U1/U2/U3 or may be physically separate therefrom. Because the number of data bits to be communicated to the functional yarn FY to define a character to be displayed is relatively lower, this arrangement may be suited to a relatively more quickly changing message, as well as to a static or slowly changing message, e.g., a scrolling message.

Consider Table 2 which illustrates a typical set of character data commands for a single character display 10, 512, 522, 532, displaying the first character ("char 1") by specifying the character (letter "A") that the functional yarn FY of a character display are to display as defined by a data value ("data_") associated therewith:

TABLE 2

| ALD Command with ROM | |
|---|---|
| Command | Operation |
| char 1, data 32 | Display Letter "A" |

Because the ROM decodes the data value (e.g., "data 32") to define the column groups CG, CL, and the segments RW thereof, that are to be energized for displaying the letter "A" each letter or block is addressed independently, thereby reducing the number of commands by a factor related to the number of columns CL, CG. Additionally and advantageously, this arrangement allows for a single software interface for addressing any display 10, 200, 500 without the need to modify or customize the software for each application.

In one example addressing arrangement, a type DS2406 addressable switch U2 is disposed on functional yarn FY and a type DS9097 serial port adaptor is employed to apply addressing and control signals to the SIGNAL conductor. These devices are available from Maxim Integrated Products, and may be utilized in combination with driver software also available from Maxim Integrated Products that provides the necessary digital signals and protocols needed for operating a display 10 from a Windows-based computer, e.g., a laptop computer, using the BASIC or the C programming language.

Where the address or identifier ID of the ALD is stored in the ALD U1/U2 either prior to or during the weaving of a display 10, 200, 512, 522, 532, the address or identifier ID of each functional yarn FY may be known in sequence and a database thereof may be made as the display 10, 200, 512, 522, 532, is woven. If the address or identifier ID is assigned in accordance with a predetermined sequence, e.g., during weaving, then the database thereof may be the same for each display 10, 512, 522, 532, and the need for a database peculiar to each display 10, 512, 522, 532, may be avoided. If the address or identifier ID of the functional yarn FY are assigned before weaving, then the database thereof may made as the display 10, 512, 522, 532, is woven, however, the database for each display 10, 512, 522, 532 will be peculiar to that display.

Where the address or identifier ID of the ALD is stored in the ALD U1/U2 prior to the weaving of a display 10, 200, 512, 522, 532, but is not tracked or controlled during weaving, the address or identifier ID of each functional yarn FY may be determined after weaving by polling the functional yarn FY thereof and a database of the address or identifier ID may be made for the display 10, 512, 522, 532.

Following the polling to determine the addresses or identifiers ID of the ALD devices U1/U2 of the functional yarn FY that are present in a woven display 10, 512, 522, 532, each present functional yarn FY is addressed so as to energize the elements thereon, and the elements that are energized are detected, e.g., either manually or automatically by a detector or sensor, and the position or ordering of each functional yarn FY in the woven article 10, 200, 512, 522, 532, is noted in the database in relation to the address or identifier ID thereof. The noting or detection of the positions or order may be performed contemporaneously with the polling or may be performed thereafter.

It is noted that the foregoing addressing arrangement addresses a number of characters irrespective of the size and/or shape of each character, which may be the same or different. This is because every character display 10, 512, 522, 532 may be the same electrically at its external electrical interface even though it may be very different in size and/or arrangement of segments. Thus, an advantage accrues in that the addressing is the same for any display or sign 10, 200, 500, of few or many characters of any combination of sizes and arrangements, thereby simplifying the programming of a message, the programming software and the addressing interface. Because the various characters 10, 200, 512, 522, 532 may be electrically connected in parallel and may be independently addressed via a serial addressing arrangement SIGNAL, the present arrangement may accommodate widely different styles, sizes, lengths and other variations in the display 10, 200, 500.

It is noted that the described serial addressing arrangement is well suited to a static display of any size over a range of sizes, i.e. the display is "scalable" in that the serial addressing arrangement is the same independent of the size or number or position of the characters. Thus, the same serial addressing arrangement is suitable irrespective of the size of each character and the number of characters. The same addressing may be utilized whether the character display is relatively smaller (e.g., about 5 cm by 10 cm), or is relatively larger (e.g., about 50 cm by 100 cm), or includes characters of various sizes, and whether the display includes one character or many characters which may be of the same or of different sizes, or any combination thereof.

It is also noted that the described serial addressing arrangement is well suited to a static display and/or to a slowly changing display, such as a scrolling message display, where control signal data rate and current-carrying requirements are compatible with the number and size of conductors woven into the woven displays described and the electrical characteristics (e.g., resistance and capacitance) thereof. Increased current-carrying capacity of the described arrangement may be provided by electrically conductive yarn of greater cross-sectional dimension and/or by weaving plural electrically conductive yarn in parallel. However, communication data rates permitting video-rate refreshing would be needed for video image presentations, as might be provided by a passive matrix addressing architecture.

The novel electronic display architecture and addressing arrangement described allows for full character-based programmability for a bistable, emissive, limited connection, fabric-based sign or other display, and in addition to the variations thereof described, other variations will be apparent to one of skill in the art.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such.

While the present invention has been described in terms of the foregoing example embodiments, variations within the scope and spirit of the present invention as defined by the claims following will be apparent to those skilled in the art. For example, although display 10 is described in terms of strips or functional yarn FY woven in a fabric or textile 200, 500, display 10 need not employ strips or functional yarn FY and, even if strips or functional yarn FY are employed, the strips or functional yarn FY need not be woven into a fabric or textile. While the example display 10 is described as having 20 strips or functional yarn FY arranged in nine column groups, as few as nine strips or functional yarn may be employed, and further, a non-woven embodiment of the display may be provided on one or more substrates.

While character display 10 is illustrated as rectangular and bisected relatively symmetrically to define relatively uniform size quadrants Q, display 10 may be slanted or tilted, may be asymmetrically divided, may have quadrants Q of different sizes and proportions, may have segments that are curved or straight or a combination thereof, and may otherwise be made regular or irregular. Further, the designations "top" and "bottom" and "left" and "right" as well as the terms "horizontal" and "vertical" are for convenience of description and are not intended as limiting of the orientation of any display 10. Similarly, rows may be disposed horizontally and columns vertically, or in any desired orientation therebetween.

In addition, while the display is described as employing light-emitting diodes as light sources, other suitable light sources may be employed. Examples may include incandescent lights, neon lights, electroluminescent devices, optically reflective elements, optically transmissive elements, and the like.

While certain examples and/or embodiments are referred to as character displays, it is noted that what may be displayed thereby is not necessarily limited to characters, unless expressly limited thereto. For example, the character displays of FIGS. 2, 3 and 5 may employ "characters" in which all light source positions are operable and so such displays may be utilized to display any character and/or image that can be displayed by the number of independently actuable elements thereon, e.g., up to 20×22=440 elements in each "character" of the illustrated embodiments. Likewise, it is not necessary that any spacing be provided between "characters" so that a pleasing display of a scrolling message or image or moving image may be displayed.

What is claimed is:

1. A character display having fifty nine segments arranged in rows and columns comprising:

twenty eight segments defining a periphery of a generally rectangular character display, the twenty eight segments including one relatively shorter segment disposed at each corner of the generally rectangular periphery, seven additional segments disposed to define a top side thereof, seven additional segments disposed to define a bottom side thereof, five additional segments disposed to define a first vertical side thereof and five additional segments disposed to define a second vertical side thereof, wherein each of the top, bottom and two vertical sides thereof has a relatively shorter segment in a central position, and has a pair of two relatively longer segments disposed on opposing sides of the relatively shorter central segment, and wherein each of the top and bottom sides has a relatively shorter segment disposed between each pair of relatively longer segments;

eleven additional segments disposed to define horizontal and vertical dividers that divide the generally rectangular character display to define four quadrants thereof, wherein six segments of the eleven additional segments are arranged to divide the generally rectangular character display in the horizontal direction between the relatively shorter central segment of each vertical side thereof and wherein four segments of the eleven additional segments are arranged to divide the generally rectangular character display in the vertical direction between the relatively shorter central segments of the top and bottom sides thereof, wherein one segment of the eleven additional segments is located where lines defined by the six segments and the four segments intersect and is relatively centrally located within the generally rectangular character display; and five segments disposed within each of the four quadrants, each quadrant including a generally centrally located relatively shorter segment and four relatively longer segments radiating diagonally from the relatively shorter central segment toward the relatively shorter segments disposed at each of the four corners of each quadrant.

2. The character display of claim 1 wherein the respective segments of the top and bottom sides and of the horizontal divider are arranged in respective rows and wherein the respective segments of the two vertical sides and of the vertical divider are arranged in respective columns.

3. The character display of claim 1 wherein the fifty nine segments are arranged in seven rows and nine columns.

4. The character display of claim 3 wherein:

the twenty eight segments defining the periphery of said character display comprise first and seventh rows, and first and ninth columns, thereof; and/or the eleven additional segments of said character display comprise a fourth row and a fifth column thereof.

5. The character display of claim 3 wherein:

the five segments disposed within a first of the four quadrants comprise parts of second and third rows and parts of second through fourth columns;

the five segments disposed within a second of the four quadrants comprise parts of fifth and sixth rows and parts of the second through fourth columns;

the five segments disposed within a third the four quadrants comprise parts of the second and third rows and parts of sixth through eighth columns; and the five segments disposed within a fourth of the four quadrants comprise parts of the fifth and sixth rows and parts of the sixth through eighth columns.

6. The character display of claim 3 wherein the first, second, fourth through sixth, eighth and ninth columns each include seven segments, and wherein the third and seventh columns each include five segments.

7. The character display of claim 1 wherein each of the columns thereof comprises at least one functional yarn woven in a fabric, wherein each functional yarn includes a plurality of light emitting segments thereon corresponding to the rows of said character display.

8. The character display of claim 7 wherein the fifty nine segments are arranged in nine columns, wherein the first, fifth and ninth columns each comprise two functional yarn, wherein the second, fourth, sixth and eighth columns each comprise three functional yarn, and wherein the third and seventh columns each include one functional yarn.

9. A character display having fifty nine segments arranged in rows and columns comprising:
twenty eight segments defining a periphery of a generally rectangular character display, the twenty eight segments including one segment disposed at each corner of the generally rectangular periphery, and four groups of five or more additional segments each disposed to define a respective side thereof;
eleven additional segments disposed to define intersecting dividers that divide the generally rectangular character display to define four quadrants thereof, wherein one segment of the eleven additional segments is disposed generally centrally within the generally rectangular character display and the ten other segments of the eleven additional segments are arranged to extend from the one generally centrally disposed segment of the eleven additional segments to the respective sides of the generally rectangular character display; and
five segments disposed within each of the four quadrants, each quadrant including a generally centrally located segment and four segments radiating diagonally from the central segment toward each of the four corners of each quadrant.

10. The character display of claim 9 wherein the fifty nine segments are arranged in seven rows and nine columns.

11. The character display of claim 9 wherein each of the columns thereof comprises at least one functional yarn woven in a fabric, wherein each functional yarn includes a plurality of light-emitting segments thereon corresponding to the rows of said character display.

12. The character display of claim 9 wherein the fifty nine segments are arranged in nine columns, wherein the first, fifth and ninth columns each comprise two functional yarn woven in a fabric, wherein the second, fourth, sixth and eighth columns each comprise three functional yarn woven in the fabric, and wherein the third and seventh columns each comprise one functional yarn woven in the fabric.

13. A display embodied in a woven article for displaying a number of characters, each character having segments arranged in a plurality of rows and a plurality of columns, said character display comprising:
a number of characters each comprising:
a plurality of functional yarn woven generally parallel to each other in the woven article and defining a number M of columns of the display, each of said plurality of functional yarn including a plurality of display elements thereon defining a number N of rows of the display, wherein the display elements define the segments of the display, and wherein M and N are positive integers;
each one of said plurality of functional yarn further comprising an addressable latched driver thereon for receiving an addressing signal and selectively energizing ones of the plurality of display elements of said one of said plurality of functional yarn responsive to the addressing signal;
a plurality of insulating yarn interwoven in the woven article in a direction parallel to said plurality of functional yarn between adjacent ones of the characters for defining a spacing therebetween;
a plurality of insulating yarn interwoven in the woven article in a direction transverse to said plurality of functional yarn;
a plurality of electrically conductive yarn interwoven in the woven article in a direction transverse to said plurality of functional yarn,
wherein one of said electrically conductive yarn contacts the plurality of functional yarn at its intersections therewith for applying electrical power thereto, and
wherein another of said electrically conductive yarn contacts the plurality of functional yarn at its intersections therewith for applying addressing signal thereto for addressing the addressable latched drivers thereon.

14. The display of claim 13 wherein the number of functional yarn defining a column is one, two, three and combinations thereof, and wherein the number of display elements defining a segment is zero, one, two, three, four and combinations thereof.

15. The display of claim 13 wherein the number M of columns is nine or less and wherein the number N of rows is seven or less.

16. The display of claim 13 wherein the number M of columns is nine and wherein each of the first, fifth and ninth columns includes three relatively shorter segments and four relatively longer segments.

17. The display of claim 16 wherein one relatively shorter segment is disposed at each end of the first, fifth and ninth columns, wherein the four relatively longer segments are disposed between the relatively shorter segments at the ends of the first, fifth and ninth columns, and wherein the third relatively shorter segment is disposed between a second and a third of the relatively longer segments thereof.

18. The display of claim 13 wherein the number M of columns is nine and wherein each of the third and seventh columns includes five relatively shorter segments and no relatively longer segments.

19. The display of claim 13 wherein the number M of columns is nine and wherein each of the second, fourth, sixth and eighth columns includes a plurality of said functional yarn each having seven segments thereon, wherein the first, fourth and seventh display elements of said plurality of functional yarn define three relatively longer segments disposed transversely to the direction of the plurality of functional yarn, and wherein the second, third, fifth and sixth display segments thereof define four relatively longer segments disposed diagonally thereto.

20. The display of claim 13 severed in the direction generally parallel to the plurality of functional yarn in the space between adjacent ones of the characters thereof defined by said plurality of insulating yarn, whereby a display having a desired number of characters is provided.

21. The display of claim 13 further comprising:
a common substrate on which said display embodied in a woven article is disposed;
at least one additional display embodied in a woven article as set forth in claim 13 disposed on said common substrate;
a plurality of electrical conductors of said common substrate coupled to the respective ones of the plurality of electrically conductive yarn of each of said woven articles for coupling electrical power and electrical addressing signal thereto.

* * * * *